(12) United States Patent
Limaye et al.

(10) Patent No.: US 7,398,421 B1
(45) Date of Patent: Jul. 8, 2008

(54) SYSTEM AND METHOD FOR STORAGE AREA NETWORK SWITCH PORT FAILURE RECOVERY

(75) Inventors: Prasad Limaye, Maharashtra (IN); Gopal Sharma, San Jose, CA (US); Amitava Guha, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 626 days.

(21) Appl. No.: 11/004,525

(22) Filed: Dec. 3, 2004

(51) Int. Cl.
*G06F 11/00* (2006.01)
(52) U.S. Cl. .......................... 714/18; 714/16
(58) Field of Classification Search ............... 714/16, 714/18
See application file for complete search history.

(56) References Cited

U.S. PATENT DOCUMENTS

| | | | |
|---|---|---|---|
| 6,629,264 B1 * | 9/2003 | Sicola et al. ................ | 714/15 |
| 6,857,050 B2 | 2/2005 | Lee et al. | |
| 7,203,796 B1 * | 4/2007 | Muppalaneni et al. ....... | 711/114 |
| 7,206,863 B1 * | 4/2007 | Oliveira et al. .............. | 709/245 |
| 7,209,986 B2 * | 4/2007 | Ohno et al. ................... | 710/74 |
| 2004/0143702 A1 * | 7/2004 | Valdevit ..................... | 711/111 |
| 2005/0251540 A1 * | 11/2005 | Sim-Tang .................. | 707/202 |

* cited by examiner

*Primary Examiner*—Gabriel L Chu
(74) *Attorney, Agent, or Firm*—Robert C Kowert; Meyertons, Hood, Kivlin, Kowert & Goetzel, P.C.

(57) ABSTRACT

Systems and methods for storage area network switch port failure recovery. A system may include several hosts, storage devices and a storage area network (SAN) switch. The SAN switch may include several ports, where each host is coupled to a respective host port and each storage device is coupled to a respective storage port. The SAN switch may also include virtualization logic configured to map several of the storage devices as a volume presented to the hosts via the respective host ports, and an input/output (I/O) tracking mechanism configured to store information about write operations in progress at each of the ports. In response to a failure of a given port occurring while write operation(s) to the volume received via one or more of the respective host ports are in progress, the SAN switch may be configured to initiate consistency recovery of the volume using the stored information.

21 Claims, 4 Drawing Sheets

SYSTEM AND METHOD FOR STORAGE AREA NETWORK SWITCH PORT FAILURE RECOVERY

BACKGROUND

1. Field of the Invention

This invention relates to data storage and, more particularly, to techniques for failure recovery in storage systems.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices from many different manufacturers.

In some systems, storage devices may be arranged in a storage area network (SAN) that includes a SAN switch configured to interconnect storage devices with host systems that may be configured to execute applications dependent on the storage devices. SAN switches may generally provide flexibility in the design of a storage system, as they may be configured to provide many hosts with access to many different storage devices without requiring direct coupling of each of the hosts and storage devices. However, in the event of a failure of a SAN switch port, data inconsistency may occur, which may result in incorrect application execution.

For example, to provide for a degree of security against loss of critical data, such data may be stored on several storage devices connected to a SAN switch, where one storage device is configured to mirror another. One of the mirrored devices may thus provide a backup source of data in case another one of the mirrored devices fails. However, if a failure of a SAN switch port occurs during system operation, mirrored storage devices may not reflect the same data (i.e., may become inconsistent), for example if data is written to one mirrored device but not another as a consequence of the failure. In some cases, consistency may need to be restored to inconsistent storage devices following a failure in order for applications to continue operating properly. However, such consistency recovery may be a time-consuming task, for example if recovery is performed with respect to entire devices. Often, applications must be prevented from using inconsistent devices until consistency has been restored, which may result in large application downtimes or unacceptable performance degradation.

SUMMARY

Various embodiments of systems and methods for storage area network switch port failure recovery are disclosed. In one embodiment, a system may include several hosts and storage devices as well as a storage area network switch. The storage area network switch may include several ports, where each of the several hosts is coupled to a respective host port, and where each of the several storage devices is coupled to a respective storage port. The storage area network switch may also include virtualization logic configured to map two or more of the storage devices as a volume presented to one or more of the hosts via the respective host ports. The volume may include a plurality of data blocks. The storage area network switch may further include an input/output (I/O) tracking mechanism configured to store information about write operations in progress at each of the several ports. In response to a failure of a given port occurring while one or more write operations to the volume received via one or more of the respective host ports are in progress, the storage area network switch may be configured to initiate consistency recovery of the volume using the stored information about write operations in progress at the given port.

A method is further contemplated that in one embodiment includes a storage area network switch mapping two or more of several storage devices as a volume presented to one or more of several hosts via respective host port, where the volume includes a plurality of data blocks. The method may further include the storage area network switch storing information about write operations in progress at each of the several ports, and in response to a failure of a given port occurring while one or more write operations to the volume received via one or more of the respective host ports are in progress, the storage area network switch initiating consistency recovery of the volume using the stored information about write operations in progress at the given port.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Storage System Architecture

Figure 1:
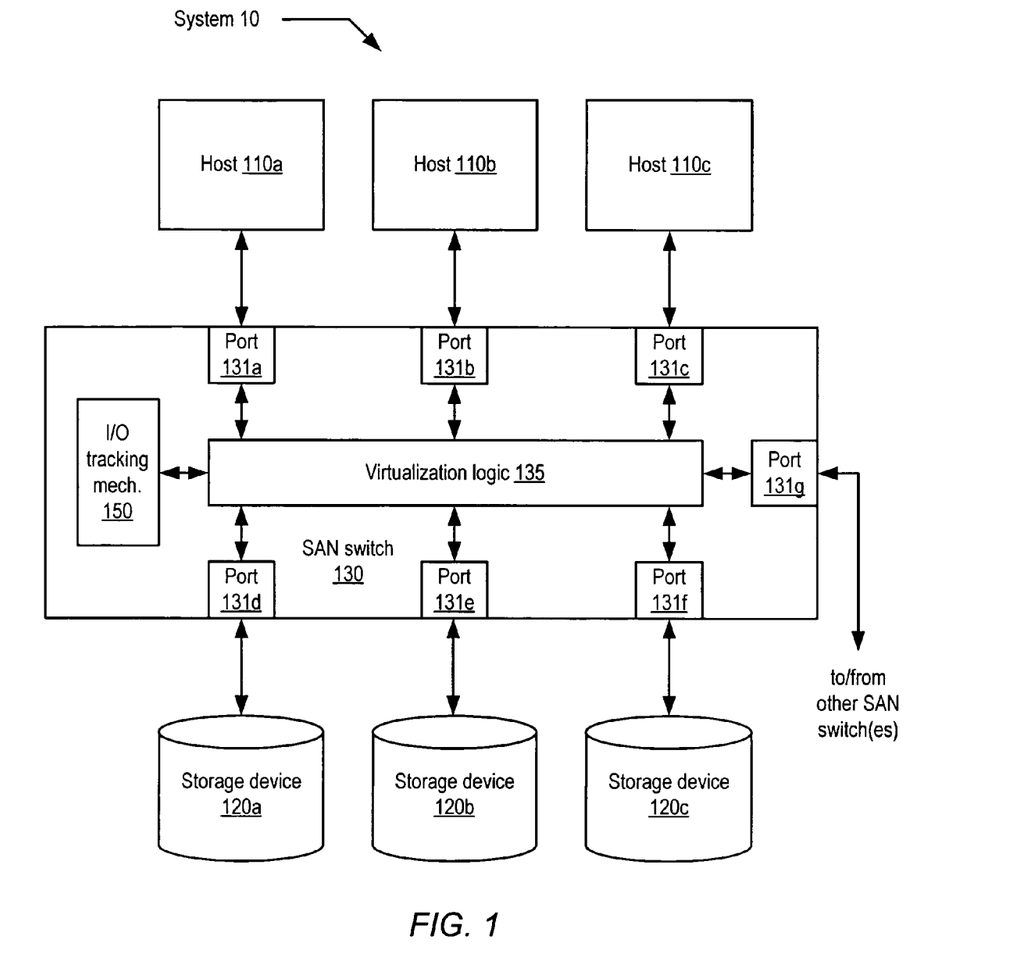
FIG. 1 is a block diagram illustrating one embodiment of a storage system.

FIG. 1 illustrates a storage system 10 according to one embodiment. In the illustrated embodiment, system 10 includes a plurality of hosts 110*a-c* configured to access a plurality of storage devices 120*a-c* via a storage area network (SAN) switch 130. Specifically, in the illustrated embodiment, SAN switch 130 includes a plurality of ports 131*a-g*. Hosts 110*a-c* are coupled to SAN switch 130 via respective host ports 131*a-c*, and storage devices 120*a-c* are coupled to SAN switch 130 via respective storage ports 131*d-f*. In some embodiments, port 131*g* may be configured for coupling to another SAN switch similar to SAN switch 130. In the illustrated embodiment, ports 131 are configured to communicate with each other via virtualization logic 135 as described in greater detail below. Virtualization logic 135 is also configured to communicate with input/output (I/O) tracking mechanism 150 as described below. It is noted that in other embodiments, any number of hosts 110, storage devices 120 and ports 131 may be included within system 10.

Storage devices 120 may be configured for data storage. Specifically, in one embodiment, each of storage devices 120 may include a block storage device that may be presented directly for use by a block device consumer or client, such as an application (e.g., a database application) or a file system. Generally speaking, a block storage device may include a hardware or software entity that provides a collection of linearly addressed data blocks that can be read or written. For example, in one embodiment a given storage device 120 may include a single disk drive configured to present all of its sectors as an indexed array of blocks. It is contemplated that any suitable type of storage device may be configured as a block storage device 120. For example, potential block storage devices may include fixed or removable magnetic media drives (e.g., hard drives, floppy or Zip-based drives), writable or read-only optical media drives (e.g., CD or DVD), block-based tape drives, solid-state mass storage devices, or any other type of storage device.

In some embodiments, all or portions of multiple storage devices 120 may be combined and presented as a single, logical block device to a block device consumer or client. For example, several different block storage devices 120 (such as disks) each having their own respective block address spaces may be mapped into a single block address space corresponding to a logical block device. Such a mapping may also be referred to as storage or block virtualization, or simply as virtualization. Logical block devices may also be referred to as volumes.

The virtualization mapping underlying a given volume may range from simple to arbitrarily complex. For example, in one embodiment a volume may be configured as a simple spanning of two or more different storage devices 120. That is, such a volume having an address space of B=M+N blocks may be configured as the union of M contiguous blocks from storage device 120a and N contiguous blocks from storage device 120b, where blocks 0 through M−1 of the volume map to corresponding blocks of storage device 120a, and blocks M though N−1 of the volume map to corresponding blocks of storage device 120b. Thus, different block device address spaces may be aggregated into a single, logical address space of arbitrary size.

Alternatively, in another embodiment a volume may be configured as a striping across two or more storage devices 120. For example, in one embodiment of striping, contiguous blocks of the volume may map to alternating storage devices 120a-b, such that all even-numbered blocks of the volume reside on storage device 120a and all odd-numbered blocks of the volume reside on storage device 120b. In some embodiments, striping may increase the performance of accessing clusters or sequences of blocks in a volume, since accesses to adjacent blocks in the volume's logical block address space may be concurrently serviced by different storage devices 120.

In yet another embodiment, a volume may be configured as a mirrored volume, in which a copy of each block of the volume is stored by each of two or more storage devices 120. In some embodiments, mirroring may increase the reliability of data stored by the volume, in that if one mirrored storage device 120 fails, an intact copy of the volume data may be preserved by another mirrored storage device 120.

Multiple different virtualizations may be combined within a single volume to create relatively complex mappings of the volume to its underlying storage devices 120. For example, in one embodiment a volume may be configured to use mirroring to increase storage reliability. Rather than directly mapping each mirrored data block to a respective storage device 120, however, striping may be used in conjunction with mirroring to increase performance of accessing a given copy of volume data. For example, the volume may be configured to map to two or more logical block devices corresponding to mirror devices. In turn, each mirror device may be configured to map to two or more storage devices 120 in a striping arrangement. Thus, several mappings or translations may occur to a block read or write operation issued to a volume in order to generate corresponding read or write operations to individual storage devices 120. (Although some volumes may be defined through a series of complex virtualizations of storage devices 120, not all volumes need be so complex. In some embodiments a volume's logical block address space may correspond directly to a storage device 120's block address space as a one-to-one mapping.)

Figure 2:
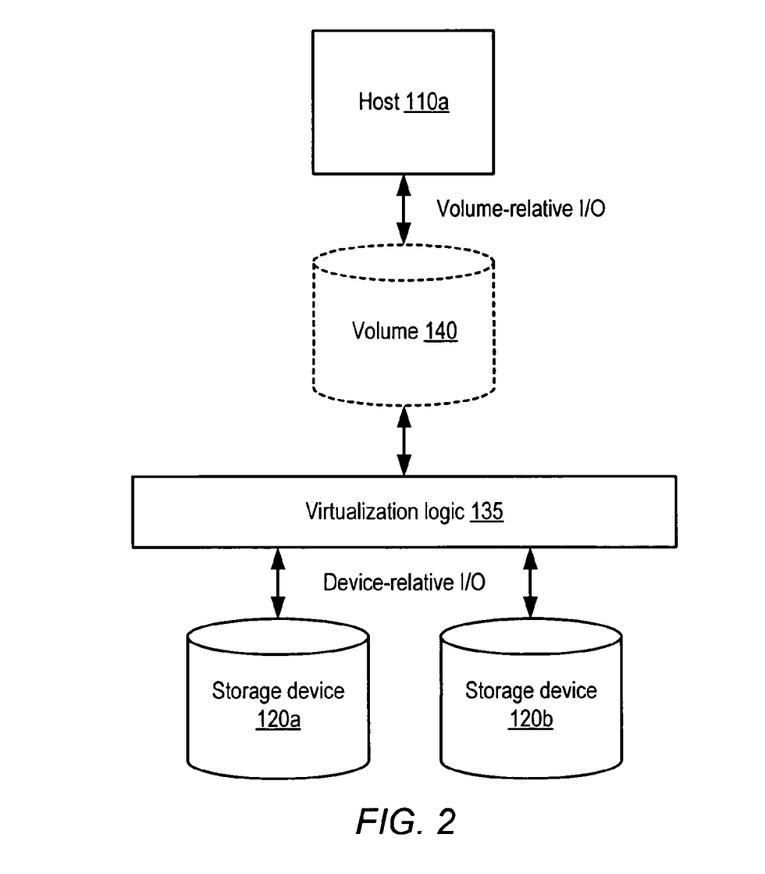
FIG. 2 is a block diagram illustrating one embodiment of a mapping relationship among hosts, volumes and storage devices.

In the illustrated embodiment, SAN switch 130 may be configured to perform some or all of the virtualization mapping for a given volume. Specifically, virtualization logic 135 may be configured to map storage devices 120, accessed via storage ports 131, into one or more volumes presented to one or more hosts 110 via host ports 131. One embodiment of a mapping relationship among hosts, volumes and storage devices is illustrated in FIG. 2. In the illustrated embodiment, data flow relationships between storage devices 120a-b and a given host 110 are emphasized. For clarity, other elements of system 10 shown in FIG. 1 are omitted, although it is noted that host 110 may be illustrative of any of hosts 100a-c, and storage devices 120a-b may be illustrative of any of storage devices 120. As shown, virtualization logic 135 may be configured to present storage devices 120a-b to host 110 as a volume 140, using any suitable mapping such as described above.

Host 110 may be configured to perform I/O operations, such as read and write operations, relative to volume 140. That is, host 110a may be configured to issue read and write operations to blocks residing within a particular logical block address space associated with volume 140. For example, host 110 may be configured as a general-purpose computer system capable of executing one or more operating systems, applications, or other types of software. Such software may generate read and write operations directed to specific data blocks, or ranges of blocks, stored by volumes 120. Alternatively, host 110 may be configured to access volume 140 on behalf of applications executing on a different system.

In some embodiments, details of how volume 140 maps to underlying storage devices 120a-b may be transparent to host 110a, and in some embodiments, a virtualized volume 140 may be indistinguishable from raw storage devices 120 to host 110a. Host 110a may be configured to interact with more than one different volume 140 presented by virtualization logic 135. In some embodiments, each volume 140 may have a corresponding unique identifier (ID) that may be used, for example by hosts 110, to differentiate volume I/O traffic.

Virtualization logic 135 may receive volume-relative I/O operations directed to volume 140 from host 110a. For example, host 110a may issue a read or write operation specifying a particular volume ID corresponding to volume 140 as well as a starting block number for the operation and a number of blocks to be accessed. (It is contemplated that in various embodiments, other information may be included within the I/O operation or a different convention may be used to identify blocks targeted by the operation.) In response to receiving such an operation, virtualization logic 135 may translate the operation into one or more device-relative I/O operations according to the mapping in use for volume 140. For example, in one embodiment virtualization logic 135 may store a table or other data structure specifying the relationship between block ranges associated with a given volume ID and corresponding block ranges associated with particular storage devices 120, and translation of volume-relative I/O to device-relative I/O may include consulting such a table. In some embodiments where multiple levels of virtualization are specified for volume 140, separate data structures may be used to represent each level of virtualization, and translating a given volume-relative I/O operation may include consulting each such data structure. Alternatively, multiple levels of virtualization may be represented by a single data structure configured to collapse out intermediate translations.

Subsequent to translating a volume-relative I/O operation into one or more device-relative I/O operations, virtualization logic 135 may be configured to convey the resultant operations to storage devices 120*a-b* as appropriate. Where data is to be returned to host 110*a* as a result of the volume-relative I/O operation (e.g., a read operation), virtualization logic 135 may be configured to perform the aforementioned translation process in reverse in order to map the device-relative I/O result to a volume-relative result.

As noted previously, in some cases a volume 140 may include multiple layers of virtualization. In some embodiments, some of the virtualization mapping of a given volume 140 may occur externally to SAN switch 130. For example, in some embodiments one or more hosts 110 may be configured to execute volume management software configured to further virtualize or reorganize storage presented by SAN switch 130. Similarly, in some embodiments multiple SAN switches 130 may be interconnected (e.g., via ports 131). In such embodiments, a SAN switch 130 closer to a host 110 may be configured to further virtualize storage presented by one or more downstream SAN switches 130, in a hierarchical fashion.

In the embodiment illustrated in FIG. 1, virtualization logic 135 may be configured to perform the mapping and translating functions described above in addition to providing generalized switching functionality (e.g., crossbar functionality) among ports 131. For example, in some embodiments, virtualization logic 135 may include logic such as a dedicated application specific integrated circuit (ASIC), a general-purpose microprocessor, a microcontroller, or other logic configurable to coordinate the transfer and translation of operations between ports 131. However, in other embodiments, it is contemplated that the functionality of virtualization logic 135 may be distributed among ports 131. For example, in one embodiment each port 131 may include an ASIC, processor or other device configured to perform translation functions pertinent to I/O received at that port, which in some cases may improve overall performance of SAN switch 130 in comparison to using centralized virtualization logic. In such distributed embodiments, a passive switching fabric or other suitable interconnect technology may be used to interconnect ports 131.

The specific manner in which the virtualization of a given volume 140 is specified, as well as the details of how such a given volume 140 is controlled, made available to various hosts 110, etc. may vary in various embodiments. In one embodiment, SAN switch 130 may be configured to implement virtualizations on behalf of a volume manager process configured externally to SAN switch 130. For example, in one such embodiment, one or more of hosts 110 may execute a volume manager process through which the available SAN switches 130 and storage devices 120 within system 10 may be interrogated and the mapping structure of a particular volume 140 may be defined in terms of those devices. Subsequent to such definition, the volume manager process may convey to SAN switch 130 (and any other relevant SAN switches) a mapping or set of mappings to be applied to volume-relative I/O directed to the particular volume 140. SAN switch 130 may then function to apply the received mappings as directed. In some embodiments SAN switch 130 may simply map input traffic to output traffic without awareness of the context of a volume. Also, in some embodiments the volume manager process may perform additional virtualization before the resultant volume 140 is presented to a particular application or client for I/O.

In another embodiment, a volume manager process may be configured to execute on SAN switch 130 itself, for example as an embedded software process executed by virtualization logic 135. For example, SAN switch 130 may be configured to execute a version of VERITAS SAN Volume Manager (SANVM) or another suitable volume manager product. In some such embodiments, SAN switch 130 may be configured to present volume 140 to a host 110 as though volume 140 were a physical storage device, such as a SCSI logical unit (LUN). Such a host 110 may then interact with volume 140 as though volume 140 were a locally-connected hardware device, which may obviate the need to run a volume manager process on host 110 and may render the logical structure of volume 140 transparent to host 110.

Port Failure and Consistency Recovery

Failures may occur during operation of SAN switch 130. More specifically, in some situations, one or more of ports 131 may fail in a variety of ways. For example, hardware associated with a port 131 may fail due to hardware quality problems, stress caused by environmental operating conditions, damage, or other causes. In many instances, hardware failures may be fatal and unrecoverable; i.e., the failed port 131 or in some instances the entire SAN switch 130 may be rendered inoperable until a hardware repair is made.

Transient or "soft" failures of SAN switch 130 are also possible. In some embodiments, as noted above, ports 131 may include programmable devices such as ASICs or processors configured to execute the switching functions associated with the port, such as I/O flow control, virtualization mapping, etc. In such embodiments, instructions or code (which may also be referred to in this context as firmware) may be used to specify the operation of ports 131 as controlled by a programmable device. Like other kinds of software code, firmware may have programming errors or "bugs" that may result in unintended or unanticipated behavior (i.e., a functional failure) of a port 131. Such functional failures may be transient in that the failing device may be capable of continuing operation, but may require restarting from a known functional state (e.g., a reset state). Functional failures of ports 131 may encompass any undesirable behavior, such as data loss or corruption, failure to complete or properly acknowledge an operation, incorrect translation of operations accessing virtualized devices, etc.

In certain situations, a port failure that occurs while a write operation is in progress to a volume 140 may result in that volume 140 entering an inconsistent state. For example, in one embodiment, a volume 140 may be configured as a mirrored volume in which two different storage devices 120 are configured to store respective mirror replicas of the data blocks stored by volume 140. During normal operation of such an embodiment, a write operation targeting volume 140 may be received from a given host 110 via a host port 131. Responsively, the volume-relative write operation may be translated (e.g., by virtualization logic 135 or by host port 131 itself) into several device-relative operations that may be conveyed to storage devices 120 via corresponding storage ports 131. Each respective replica may then be written by the corresponding storage device 120.

However, a port failure may occur after one replica has been written, but before all have been written to corresponding storage devices 120. For example, host port 131 may fail after conveying a first device-relative write operation corresponding to the first replica to one storage port 131 and before conveying a second device-relative write operation corresponding to the second replica to another storage port 131. Alternatively, a storage port 131 may fail after it receives a device-relative write operation, but before that operation is conveyed to a corresponding storage device 120. For example, in some embodiments, ports 131 may be configured to queue or buffer I/O operations, such that there may be a delay between the time an operation arrives at a port 131 and the time that operation (or a translated or mapped operation resulting from the received operation) leaves that port 131. Numerous other port failure modes are possible and contemplated.

As a result of a port failure occurring while a write operation to a mirrored volume 140 is in progress, replicas stored by different storage devices 120 may have different values. For example, one or more data blocks of one replica may reflect the effect of the write operation, while one or more data blocks of another replica may not. Consequently, subsequent read operations directed to an affected data block of volume 140 may return different, inconsistent results depending on which of storage devices 120 is selected to service the read operation. In turn, such inconsistent results may result in erroneous operation of a client or application on a host 110 that attempts to use such results. When such inconsistency is possible, volume 140 may be said to be in an inconsistent state.

Generally speaking, data inconsistency may arise whenever an initiator of a write operation to a volume 140 (such as an application or client executing on a host 110) operates on an assumption of atomicity or ordering of portions of the write operation, which assumption is subsequently violated during the execution of the write operation. In some embodiments, volumes 140 using storage virtualizations other than mirroring may be vulnerable to inconsistency due to port failures. For example, in one embodiment, data stored by a volume 140 configured to span two storage devices 120 may be vulnerable to inconsistency in case a write operation to a range of blocks of the volume 140 is mapped to both storage devices 120. If an application assumes that the specified range of blocks will be written to volume 140 atomically, but a write of some of the range of blocks to one of storage devices 120 fails (e.g., due to a port failure), volume 140 may be in an inconsistent state with respect to that application.

In another embodiment, a volume 140 may be configured as a RAID-5 (Redundant Array of Independent/Inexpensive Disks) volume in which multiple storage devices 120 store both data blocks and redundant parity information that is a function of the stored data blocks. The parity information may be used to reconstruct data in the event of failure of one or more of storage devices 120. In some RAID-5 embodiments, if data blocks and corresponding parity information are not updated atomically during a write operation to volume 140 (e.g., data blocks are written to one storage device 120, but corresponding parity information is not written to another storage devices 120 due to a port failure), volume 140 may become inconsistent with respect to parity information. Consequently, data blocks may be insufficiently protected against device failure.

Once a given volume 140 has become inconsistent, for example due to a port failure as described above, it may be possible to restore given volume 140 to a consistent state. Consistency restoration may vary depending on the nature of the virtualization of given volume 140. For example, in an embodiment where volume 140 is configured as a mirrored volume in which two or more replicas of data blocks stored by volume 140 are stored by underlying storage devices 120, inconsistency may arise if the replicas have different values for any data block, as described above. In such an embodiment, consistency of volume 140 may be restored by selecting one replica and copying all of its data blocks to each other replica. Similarly, in a RAID-5 embodiment of volume 140 in which inconsistency arises due to data blocks and corresponding parity information becoming out of synchronization, consistency may be restored by regenerating parity information from the data blocks.

However, in conventional systems, consistency recovery may take a long period of time. For example, brute-force consistency recovery may entail performing recovery operations on the entirety of a volume 140, for example by copying a value from one replica to each other replica for every data block in a mirrored volume 140. Since client access to volumes 140 that are undergoing recovery may be restricted (for example, in order to protect applications against inadvertently accessing inconsistent data), such brute-force consistency recovery may result in substantial downtime for a volume 140, which may result in downtime or degraded performance of clients and applications depending on that volume 140. In some embodiments, dirty region logging (DRL) or a different type of logging may be used to identify recently written (i.e., dirty) regions of a volume 140, and consistency recovery may be confined to those regions indicated as dirty. However, if the region size is large, the time necessary to recover one or several regions may be a substantial fraction of the time necessary to recover the entire volume 140.

In the embodiment illustrated in FIG. 1, SAN switch 130 includes an input/output (I/O) tracking mechanism 150, which may be configured to track outstanding I/O operations, such as read and/or write operations, that may be in progress at a given port 131 at a given time. For example, in one embodiment, virtualization logic 135 may notify I/O tracking mechanism 150 whenever it receives and/or completes a write operation to a given volume 140. In alternative embodiments, ports 131 may be configured to interface directly with I/O tracking mechanism 150, or the functionality of I/O tracking mechanism 150 may be distributed across ports 131 or incorporated within virtualization logic 135. In some embodiments of SAN switch 130, I/O tracking mechanism 150 may be included within a particular one of ports 131, which may be designated a master port.

Figure 3:
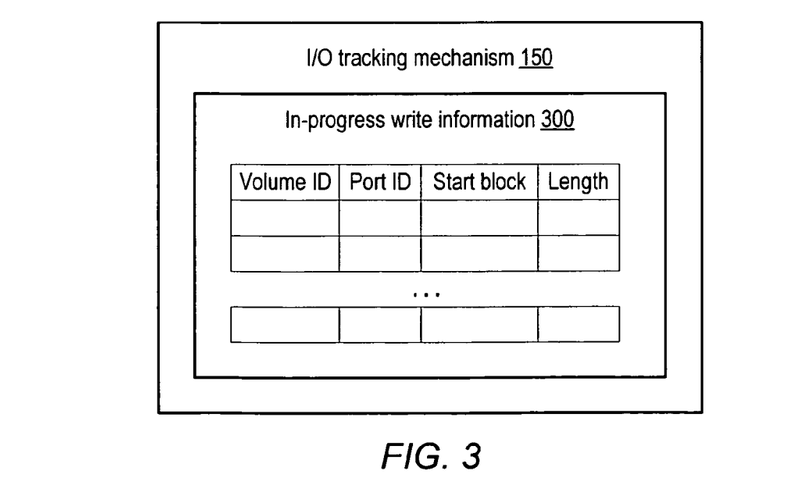
FIG. 3 is a block diagram illustrating one embodiment of an input/output tracking mechanism.

One embodiment of I/O tracking mechanism 150 is illustrated in FIG. 3. In the illustrated embodiment, I/O tracking mechanism 150 includes in-progress write information 300. In various embodiments, write information 300 may include any suitable information that may be used to identify a particular write operation in progress. In the illustrated embodiment, write information 300 includes tabular information identifying the specific volume 140 targeted by a particular write operation (volume ID), the port 131 on which the write operation was received (port ID), the initial block address of volume 140 specified by the write operation (start block), and the total number of blocks specified by the write operation (length). In other embodiments, different information may be stored. For example, in some embodiments individual write operations may be assigned their own unique identifiers, which may be stored in addition to or instead of other fields shown within write information 300. Also, in some embodiments, different methods for indicating a range of blocks targeted by a particular write operation may be employed. For example, each block may be listed explicitly.

It is noted that although write information 300 is illustrated as being stored in a tabular format, any suitable data structure may be used. It is further noted that in some embodiments, write information 300 may store information for both volume-relative write operations (e.g., as received from hosts 110) and device-relative write operations (e.g., as translated by virtualization logic 135). Thus, in some such embodiments, write information 300 may include multiple entries related to a single write operation originating from a host 110. For example, in the case of a write to a mirrored volume 140 arriving from a host at port 131a and being translated into two write operations conveyed to storage devices 120a-b via ports 131d-e, write information 300 may include three entries reflecting corresponding details of the volume- and device-relative operations. In other embodiments, write information 300 may simply store volume-relative operation details, and may rely on virtualization logic 135 to provide corresponding device-relative operation details if necessary.

Figure 4:
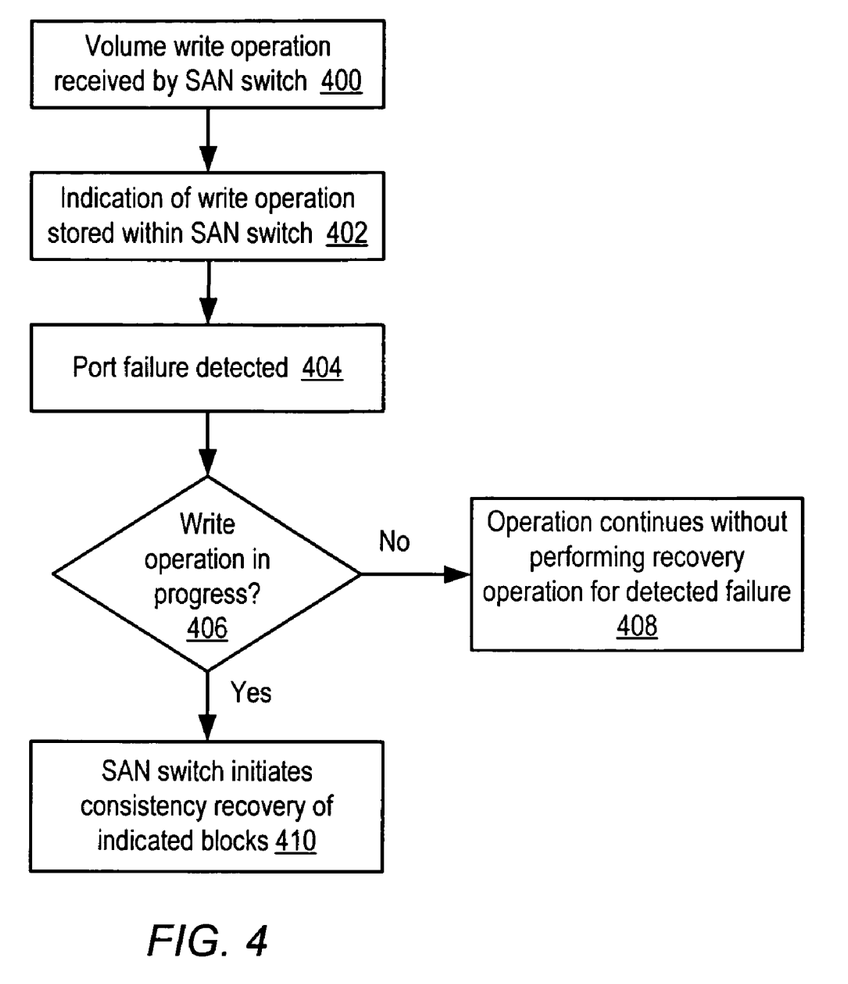
FIG. 4 is a flow diagram illustrating one embodiment of a method of recovering consistency of a volume using stored in-progress write information.

One embodiment of a method of consistency recovery using stored in-progress write information 300 is illustrated in FIG. 4. Operation begins in block 400 where a write operation to a given volume 140 is received by SAN switch 130 at a port 131. For example, such a write operation may originate from one of hosts 110. Subsequently, an indication of the received write operation is stored within write information 300 (block 402). For example, in one embodiment information identifying the volume 140 being written, the specific blocks targeted by the write information, and the identity of port 131 may be stored as part of a record within write information 300.

A port failure is subsequently detected (block 404), which may occur either before or after the previously received write operation completes. In one embodiment, SAN switch 130 may be configured to detect when a given port 131 fails. For example, virtualization logic 135, I/O tracking mechanism 150 or another port 131 may be configured to detect that a given port 131 is no longer responding to I/O requests, has entered a reset state, or has posted some other indication that it has failed.

In response to a notification of a failure of a given port 131, in-progress write information 300 is consulted to determine if a write operation was in progress at given port 131 at the time of the failure (block 406). For example, SAN switch 130 may be configured to examine write information 300 for entries having a port ID corresponding to the failed port. In some embodiments, as write operations received by SAN switch 130 complete, stored information about those operations may be removed from write information 300 or otherwise indicated as no longer in progress.

If there are no outstanding write operations in progress at the failed port 131, operation continues without performing a recovery operation for the detected failure (block 408). For example, the failed port 131 may have been idle at the time it failed, with previous write operations having completed prior to the failure. In one embodiment, if a read operation not tracked by I/O tracking mechanism 150 was in progress at the time of failure, it may be allowed to time out, and the originating host 110 may retry the read operation at a later time. (Generally speaking, read operations that have no write-type side effects may not lead to inconsistency of a volume 140, as they do not modify its state.)

If an outstanding write operation was in progress at the failed port 131, SAN switch 130 initiates a recovery operation on the block or blocks of the corresponding volume 140 as indicated within write information 300 (block 410). As noted above, the specific recovery operation initiated may depend on the type of virtualization in use by volume 140. For example, in one embodiment, if volume 400 is a mirrored volume, SAN switch 130 may place volume 400 in a mode of operation (also referred to as read-writeback mode or rwback mode) in which a read operation of a given data block is converted to a write of the read value of the given data block to all replicas of that data block. SAN switch 130 may then be configured to issue read operations to those blocks of volume 140 indicated in write information 300 to facilitate recovery of those blocks. In such an embodiment, consistency recovery of volume 140 may occur transparently to hosts 110 (i.e., hosts 110 may not be aware that a port failure and subsequent recovery operation has occurred). Alternatively, SAN switch 130 may be configured to convey the identities of those blocks of volume 140 indicated in write information 300 to a software recovery process executing on one of hosts 110. The recovery process may then issue read operations to volume 140 in a manner similar to that just described.

It is noted that in some embodiments, resources that may be configured to provide the functionality of I/O tracking mechanism 150 may already exist in some embodiments of SAN switch 130. In some such embodiments, little or no additional hardware may need to be added, and using those existing resources to optimize consistency recovery in the event of a port failure may be a matter of altering the programming (e.g., firmware) used to control SAN switch 130. For example, in some embodiments, SAN switch 130 may be configured to present one volume 140 to multiple hosts 110 for I/O, such that multiple write operations to volume 140 may concurrently originate from the multiple hosts 110. In order to ensure that multiple concurrent writes to the same volume function consistently, SAN switch 130 may be configured to serialize the order in which such write operations execute, and may include logic configured to store information about such write operations in order to serialize them. In some embodiments, such write-serializing logic may be modified to perform the write tracking for consistency recovery described above.

As noted above, in some embodiments SAN switch 130 may initiate and perform consistency recovery of a volume 140 using write information 300 in a manner that is transparent to hosts 110. However, even in embodiments where one or more of hosts 110 is involved in consistency recovery (e.g., by executing a recovery process using volume and block information provided by SAN switch 130, in response to SAN switch 130 initiating recovery), it is contemplated that recovery performance may be improved using SAN-switch-based write information 300. For example, in some embodiments recovery operations may be performed only for those blocks of a volume 140 indicated as having corresponding in-progress writes at the time of a port failure. Such directed recovery may minimize redundant recovery of blocks not affected by the failure. It is noted that in some embodiments, if for any reason recovery based on write information 300 cannot be performed (for example, due to a failure of I/O tracking mechanism 150, or a port 131 including I/O tracking mechanism 150), a full recovery of volume 140 may be initiated either by SAN switch 130 or a host 110.

Exemplary Computer System Embodiment

It is contemplated that in some embodiments, any of the methods or techniques described above may be implemented as program instructions and data capable of being stored or conveyed via a computer-accessible medium. Such program instructions may be executed to perform a particular computational function, such as volume management tasks, storage virtualization/mapping tasks, consistency recovery, operating system functionality, applications, and/or any suitable variants of the methods of data block resynchronization and storage management device selection described above.

Figure 5:
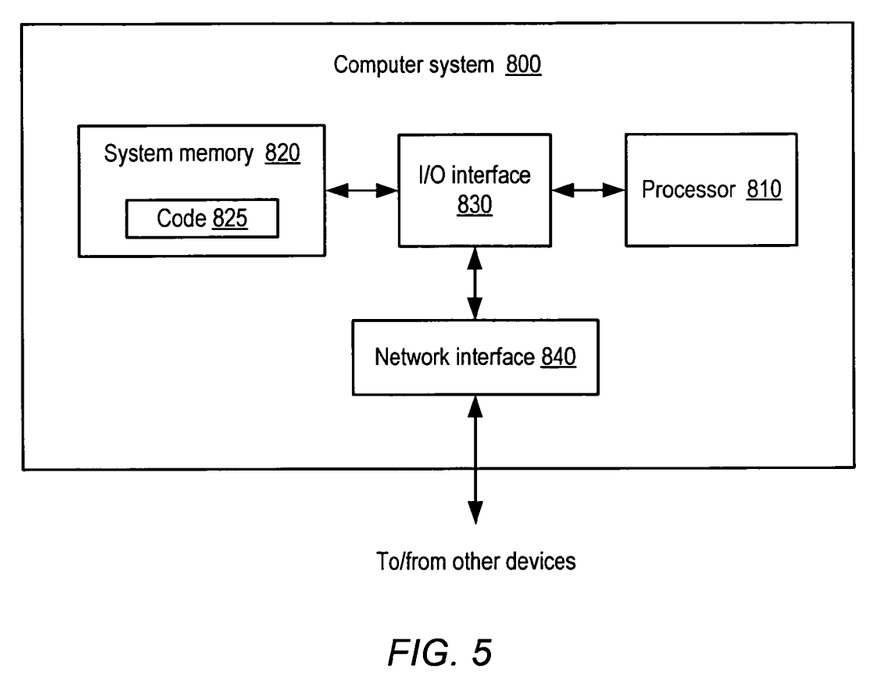
FIG. 5 is a block diagram illustrating one embodiment of a computer system.

One embodiment of a computer system including a computer-accessible medium is illustrated in FIG. 5. In the illustrated embodiment, system 800 includes a processor 810 coupled to a system memory 820 via an input/output (I/O) interface 830. System 800 further includes a network interface 840 coupled to I/O interface 830. In some embodiments, system 800 may be a general-purpose computing system illustrative of one or more of hosts 110. However, in some embodiments as noted above, SAN switch 130 may configured to execute embedded software such as volume management software. In such embodiments, system 800 may be generally illustrative of SAN switch 130, or of a particular element of SAN switch 130 such as virtualization logic 135, for example.

Processor 810 may be any suitable processor capable of executing instructions. For example, in various embodiments processor 810 may be a general-purpose or embedded processor implementing any of a variety of instruction set architectures (ISAs), such as the x86, PowerPC, SPARC, or MIPS ISAs, or any other suitable ISA. In some embodiments, multiple processors 810 may be employed, for example in a symmetric or dedicated multiprocessor arrangement.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 820 as code 825. For example, code 825 may be executable to implement volume management functions such as virtualization mapping and volume consistency recovery.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

In some embodiments where system 800 implements SAN switch 130, write information 300 may be accessible to code 825 executing on processor 810 by a device interface presented though I/O interface 830. For example, in some such embodiments, I/O tracking mechanism 150 may be implemented as a peripheral relative to system 800. Alternatively, in some embodiments write information 300 may be accessible to code 825 via network interface 840. For example, in some such embodiments, I/O tracking mechanism 150 may be implemented as a network device relative to system 800.

Network interface 840 may be configured to allow data to be exchanged between system 800 and other devices attached to a network. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. In some embodiments where system 800 implements SAN switch 130, network interface 840 may be configured to provide the interconnect functionality of one or more of ports 131.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD-ROM coupled to system 800 via I/O interface 830. A computer-accessible medium may also include any volatile or non-volatile media such as RAM (e.g. SDRAM, DDR SDRAM, RDRAM, SRAM, etc.), ROM, etc, that may be included in some embodiments of system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although the embodiments above have been described in considerable detail, numerous variations and modifications will become apparent to those skilled in the art once the above disclosure is fully appreciated. It is intended that the following claims be interpreted to embrace all such variations and modifications, and accordingly, the specifications and drawings are to be regarded in an illustrative rather than a restrictive sense.

What is claimed is:

1. A system comprising:
a plurality of hosts;
a plurality of storage devices; and
a storage area network switch comprising:
    a plurality of ports, wherein each of said plurality of hosts is coupled to a respective host one of said plurality of ports, and wherein each of said plurality of storage devices is coupled to a respective storage one of said plurality of ports;
    virtualization logic configured to map two or more of said storage devices as a volume presented to one or more of said hosts via said respective host ports, wherein said volume comprises a plurality of data blocks;
    an input/output (I/O) tracking mechanism configured to store information about write operations in progress at each of said plurality of ports;
    wherein in response to a failure of a given one of said plurality of ports occurring while one or more write operations to said volume received via one or more of said respective host ports are in progress, said storage area network switch is configured to initiate consistency recovery of said volume using said stored information about write operations in progress at said given port.

2. The system as recited in claim 1, wherein for a given write operation, said stored information about write operations in progress at each of said plurality of ports comprises a volume identifier corresponding to said volume and an indication of one or more data blocks being written to said volume.

3. The system as recited in claim 2, wherein recovering consistency of said volume comprises performing a recovery operation only on said one or more data blocks indicated as being written to said volume.

4. The system as recited in claim 2, wherein said volume is configured as a mirrored volume comprising two or more replicas of each of said plurality of data blocks.

5. The system as recited in claim 4, wherein recovering consistency of said volume comprises, for each of said one or more data blocks indicated as being written to said volume, selecting one of said replicas of said indicated block and copying said selected replica to each other replica of said indicated block.

6. The system as recited in claim 1, wherein said storage area network switch is further configured to recover consistency of said volume transparently to said plurality of hosts.

7. The system as recited in claim 1, wherein said I/O tracking mechanism is included in a master one of said plurality of ports.

8. A method comprising:
   a storage area network switch mapping two or more of a plurality of storage devices as a volume presented to one or more of a plurality of hosts via respective host ones of a plurality of ports, wherein said volume comprises a plurality of data blocks;
   said storage area network switch storing information about write operations in progress at each of said plurality of ports;
   in response to a failure of a given one of said plurality of ports occurring while one or more write operations to said volume received via one or more of said respective host ports are in progress, said storage area network switch initiating consistency recovery of said volume using said stored information about write operations in progress at said given port.

9. The method as recited in claim 8, wherein for a given write operation, said stored information about write operations in progress at each of said plurality of ports comprises a volume identifier corresponding to said volume and an indication of one or more data blocks being written to said volume.

10. The method as recited in claim 9, wherein recovering consistency of said volume comprises performing a recovery operation only on said one or more data blocks indicated as being written to said volume.

11. The method as recited in claim 9, wherein said volume is configured as a mirrored volume comprising two or more replicas of each of said plurality of data blocks.

12. The method as recited in claim 11, wherein recovering consistency of said volume comprises, for each of said one or more data blocks indicated as being written to said volume, selecting one of said replicas of said indicated block and copying said selected replica to each other replica of said indicated block.

13. The method as recited in claim 8, wherein said storage area network switch is further configured to recover consistency of said volume transparently to said plurality of hosts.

14. The method as recited in claim 8, wherein said stored information about write operations in progress at each of said plurality of ports is stored in a master one of said plurality of ports.

15. A computer-accessible storage medium, storing program instructions, wherein the program instructions are computer-executable to:
   map two or more of a plurality of storage devices as a volume presented to one or more of a plurality of hosts via respective host ones of a plurality of ports of a storage area network switch, wherein said volume comprises a plurality of data blocks;
   in response to a failure of a given one of said plurality of ports, access information about write operations in progress at said given port, wherein said information is stored by said storage area network switch; and
   in response to determining that said failure occurred while one or more write operations to said volume are in progress, as indicated by said write operation information, initiate consistency recovery of said volume using said write operation information.

16. The computer-accessible storage medium as recited in claim 15, wherein for a given write operation, said write operation information comprises a volume identifier corresponding to said volume and an indication of one or more data blocks being written to said volume.

17. The computer-accessible storage medium as recited in claim 16, wherein recovering consistency of said volume comprises performing a recovery operation only on said one or more data blocks indicated as being written to said volume.

18. The computer-accessible storage medium as recited in claim 16, wherein said volume is configured as a mirrored volume comprising two or more replicas of each of said plurality of data blocks.

19. The computer-accessible storage medium as recited in claim 18, wherein recovering consistency of said volume comprises, for each of said one or more data blocks indicated as being written to said volume, selecting one of said replicas of said indicated block and copying said selected replica to each other replica of said indicated block.

20. The computer-accessible storage medium as recited in claim 15, wherein said program instructions are further executable to recover consistency of said volume transparently to said plurality of hosts.

21. The computer-accessible storage medium as recited in claim 15, wherein said write operation information is stored in a master one of said plurality of ports.

* * * * *